No. 772,781. PATENTED OCT. 18, 1904.
W. F. CARLBERG.
WRENCH.
APPLICATION FILED MAR. 1, 1904.
NO MODEL.
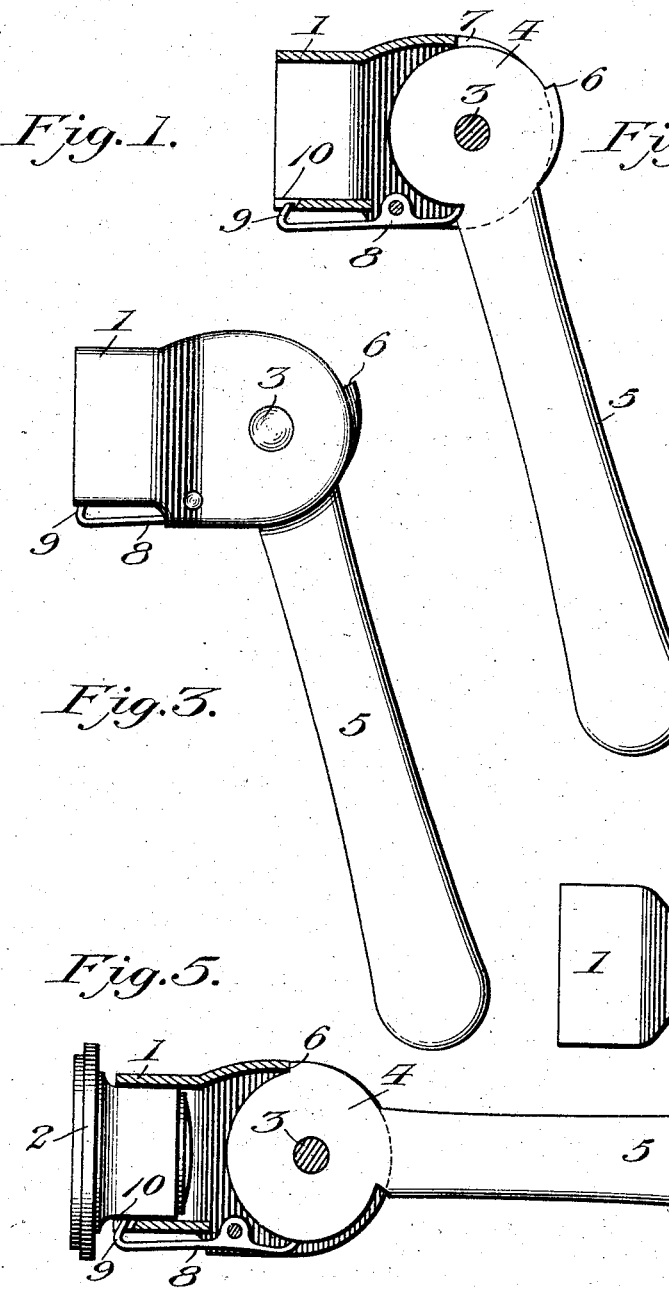
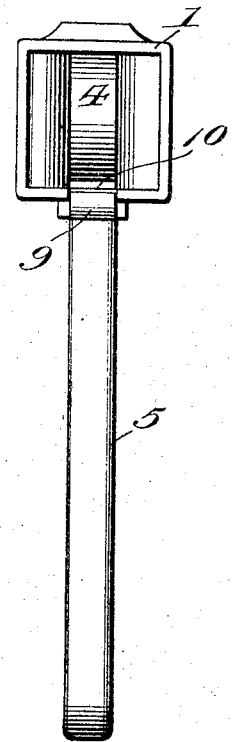
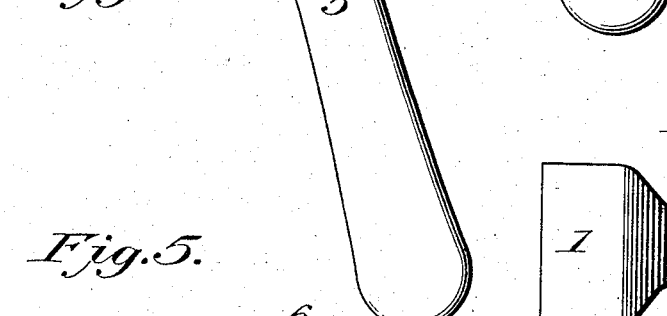
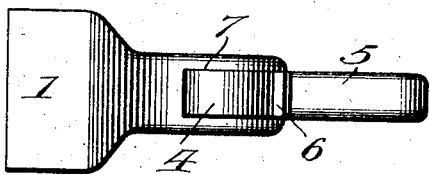
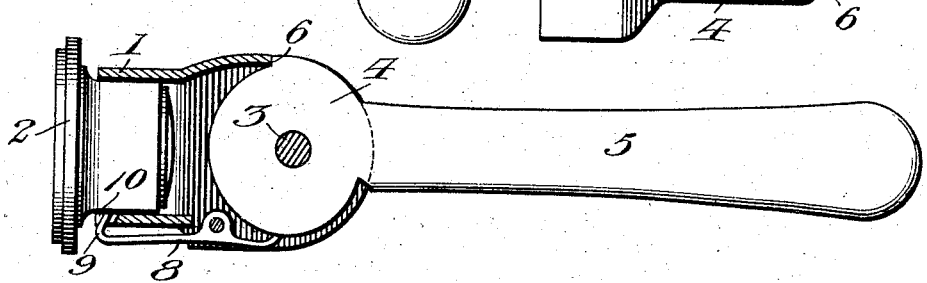
Witnesses
Edwin G. McKee
Herbert D. Lawson
Inventor
Walfred F. Carlberg
By Victor J. Evans
Attorney No. 772,781. Patented October 18, 1904.

UNITED STATES PATENT OFFICE.

WALFRED F. CARLBERG, OF SISSETON, SOUTH DAKOTA.

WRENCH.

SPECIFICATION forming part of Letters Patent No. 772,781, dated October 18, 1904.

Application filed March 1, 1904. Serial No. 195,963. (No model.)

*To all whom it may concern:*

Be it known that I, WALFRED F. CARLBERG, a citizen of the United States, residing at Sisseton, in the county of Roberts and State of South Dakota, have invented new and useful Improvements in Wrenches, of which the following is a specification.

My invention relates to new and useful improvements in wrenches especially adapted for removing burs from vehicle-axles and for placing the same in position thereon.

The object of the invention is to provide a wrench by means of which the bur can be readily detached from the axle and securely held without the necessity of grasping the same with the hand. The great objection to devices ordinarily employed for this purpose is the fact that the bur must be taken in the hand, and the grease upon it often soils the hand or the glove which may cover it. My invention, however, provides means whereby the bur may be securely gripped and held after it has been detached from the shaft.

The invention consists of a hollow head adapted to receive the bur and having a handle pivoted therein and provided with an eccentric which acts upon a lever pivoted within the head and is adapted to press it inward when the handle is moved into a predetermined position.

The invention also consists in the further novel construction and combination of parts, hereinafter more fully described and claimed, and illustrated in the accompanying drawings, showing the preferred form of my invention, and in which—

Figure 1 is a longitudinal section through the wrench and showing the handle and lever in elevation, said lever being removed from clamping position. Fig. 2 is a rear elevation of the tool. Fig. 3 is a side elevation thereof. Fig. 4 is a top plan view, and Fig. 5 is a view similar to Fig. 1 and showing the lever clamped upon a bur.

Referring to the figures by numerals of reference, 1 is a hollow head having an open-end shaft to fit upon a bur 2. A pin 3 extends through the head near its other end and forms a bearing having an eccentric 4, which is arranged at the inner end of a handle 5. This eccentric has a stop 6 thereon adapted to contact with one end of a slot 7, formed in the adjoining end of the head, and the periphery of the eccentric contacts with the inner end of a lever 8, which is fulcrumed in one side of the head and has a clamping extension 9, which projects through a recess 10, formed in one side of the head. The eccentric is so arranged that when the handle 5 is swung at an angle to the head the clamping extension 9 of the lever 8 is free to move from the head 1, but when the handle 8 is swung into alinement with the head 6 the eccentric presses outward upon the inner end of the lever 8 and forces the extension 9 into the head.

When it is desired to remove a bur from an axle, the head 1 is placed upon the bur, and the handle 5 is swung upon its pivot until further inward movement thereof is prevented by said handle contacting with lever 8. The bur is then loosened by rotating the head 1, and after this operation the handle 5 is swung into alinement with the head, and the eccentric 4 swings the lever 8 on its pivot and presses the extension 9 into contact with one face of the bur and firmly clasps the bur within the head. The further rotation of the bur can be readily produced when the handle is in alinement with the head, and after the bur has been detached it will be held in position within the head and can be readily replaced by reversing the operation above described. It will be seen that by employing this tool it is unnecessary to touch the bur with the hands at any time during the operation of removing or replacing it.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a device of the character described, the combination with a hollow head having a recess in one wall; of a spring-lever pivoted within the head and extending longitudinally along the outer face thereof, said lever having an extension adapted to project through the recess, an eccentric revolubly mounted within one end of the head and adapted to operate the lever, and a handle extending from the eccentric.

2. The combination with a hollow head adapted to receive a nut in one end thereof, and a recess in one wall of the head and adjacent said end; of a spring-lever pivoted between its ends within the head and extending longitudinally along the outer side thereof, said lever having an extension adapted to project through the recess and into contact with one face of a nut within the head, an eccentric revolubly mounted within the head adjacent one end and having shoulders for limiting its movement, said eccentric being adapted to swing the lever upon its fulcrum, and a handle extending from the eccentric.

3. In a device of the character described, the combination with a head adapted to receive a nut, a movable handle within the head and adapted to extend from and aline with the head, and a lever separated from and operated by the handle and adapted to clamp a nut within the head when said handle is moved in one direction.

In testimony whereof I affix my signature in presence of two witnesses.

WALFRED F. CARLBERG.

Witnesses:
 JOHN BARRINGTON,
 JENNIE WHELDON.